(12) United States Patent
Qin

(10) Patent No.: US 9,853,256 B2
(45) Date of Patent: Dec. 26, 2017

(54) BATTERY BOX AND A NECKLACE PROVIDED WITH THE SAME

(71) Applicant: ACE GIFT & CRAFT(NINGBO)CO., LTD, Ningbo (CN)

(72) Inventor: Yanbei Qin, Ningbo (CN)

(73) Assignee: ACE GIFT & CRAFT(NINGBO)CO., LTD, Ningbo (CN)

( * ) Notice: Subject to any disclaimer, the term of this patent is extended or adjusted under 35 U.S.C. 154(b) by 3 days.

(21) Appl. No.: 15/196,062

(22) Filed: Jun. 29, 2016

(65) Prior Publication Data

US 2017/0012256 A1 Jan. 12, 2017

(30) Foreign Application Priority Data

Jul. 6, 2015 (CN) .................... 2015 2 0490756 U

(51) Int. Cl.
*H01M 2/10* (2006.01)
*H01M 10/42* (2006.01)
*A44C 15/00* (2006.01)

(52) U.S. Cl.
CPC ....... *H01M 2/1044* (2013.01); *H01M 10/425* (2013.01); *A44C 15/005* (2013.01); *A44C 15/0015* (2013.01); *H01M 2220/30* (2013.01)

(58) Field of Classification Search
CPC .............................................. H01H 2003/007
USPC ....................................................... 200/534
See application file for complete search history.

(56) References Cited

U.S. PATENT DOCUMENTS

| 5,575,380 | A | * | 11/1996 | Imai ......................... | H01H 9/04 200/302.2 |
| 5,842,561 | A | * | 12/1998 | Takahashi .......... | H01H 11/0056 200/406 |
| 6,914,206 | B2 | * | 7/2005 | Mukougawa ........ | H05K 5/0017 200/332 |
| 7,098,417 | B1 | * | 8/2006 | Fuji ......................... | H01H 13/14 200/296 |
| 7,423,867 | B2 | * | 9/2008 | Yamamoto .............. | B60R 25/24 340/502 |
| 7,772,507 | B2 | * | 8/2010 | Orr ......................... | G06F 1/1626 200/5 R |

(Continued)

FOREIGN PATENT DOCUMENTS

CN 103431585 A * 12/2013 ............. A44C 11/02
CN 103431585 B 5/2015

*Primary Examiner* — Adrian S Wilson
(74) *Attorney, Agent, or Firm* — Gokalp Bayramoglu

(57) ABSTRACT

The present invention relates to as battery box comprising a housing and a power supply component mounted within the housing. Through holes are provided respectively on both ends of the housing to lead a wire into the housing to connect with the power supply component. The power supply includes a circuit hoard and a battery. The housing includes an upper housing body and lower housing body which are detachably connected with each other. The upper housing body and the lower housing body could be engaged with each other to form a receiving cavity to receive the power supply component. A contact is provided on the circuit board to be in communication with the battery and correspondingly, a flexible sheet is provided on the upper housing body to press the contact. The present invention further relates to a necklace provided with the said battery box.

19 Claims, 8 Drawing Sheets

(56) References Cited

U.S. PATENT DOCUMENTS

| | | | | |
|---|---|---|---|---|
| 2005/0161313 | A1* | 7/2005 | Sorrentino | A61C 17/221 200/332 |
| 2006/0238296 | A1* | 10/2006 | Konno | B60R 25/02 340/5.61 |
| 2009/0040712 | A1* | 2/2009 | Hoshi | G06F 1/1616 361/679.39 |
| 2010/0054493 | A1* | 3/2010 | Lin | H01H 9/0228 381/74 |
| 2011/0180380 | A1* | 7/2011 | Lee | H01H 13/14 200/534 |
| 2012/0067711 | A1* | 3/2012 | Yang | H01H 13/86 200/341 |

* cited by examiner

BATTERY BOX AND A NECKLACE PROVIDED WITH THE SAME

BACKGROUND OF THE INVENTION

Field of Invention

The present invention relates to a battery box and a necklace provided with the said battery box in the field of luminous jewelry.

Related Art

The battery box is a conventional means to provide power energy. A connecting lock catch is most frequently used for joining both ends of a piece of jewelry. With development of life quality, the battery box has been used as the connecting lock catch in the prior art, to provide power energy and a luminous effect to jewelry.

In an issued Chinese Patent No. CN103431585B entitled as "A Connecting Lock Catch and A Necklace Provided with the Same", the application number of which is 201310313950.5, discloses such a configuration that the connection lock catch comprises a housing and a housing cover which match with each other; the housing is provided with an accommodating space, and a battery pack, a circuit board and a switch are disposed in the accommodating space; and the two ends of the housing are respectively provided with a clamping buckle and a clamping groove which match with each other. The clamping buckle is provided with clamping plates, and the clamping plates are parallel to the end face of the housing, disposed at intervals and connected with the bottom of the housing via a connection piece. The clamping groove is provided with a notch matching with the connection piece, and the clamping groove is provide with a concave opening and side notches. The necklace provided with the connection lock catch comprises one or more connection lock catches which are in buckling connection, and also comprises a necklace chain capable of being charged with electricity and a necklace pendant capable of being lightened by controlling the switch. The winding and connecting among the necklace chains are convenient by using the clamping buckle and the clamping groove of the connection lock catch. Meanwhile, the circuit board disposed in the connection lock catch is convenient for the connection of the switch control circuit, and the switch control circuit is stable and reliable. Additionally-installed clips are convenient for clamping and arrangement of the multiple necklace chains, and the clips are neat and beauty.

Though The connecting lock catch as mentioned above is convenient for clamping and arrangement of the multiple necklace chains, there is inconveniency existing among various components thereof, particularly in terms of assembly and connection between the switch and the circuit board. Additionally, the lamps connected in series shall have the same current, so that light of only one color is available to each of the lamps on the necklace. Complicated circuits and structures have to be provided to make each lamp emit light of a different color, which is inconvenient for production and assembly.

As such, in order to address the technical problems existing in the conventional battery box and necklace, a battery box of a simple and reasonable configuration, and of convenience in assembly, connection and use, has to be provided.

SUMMARY OF THE INVENTION

In order to address the aforesaid defects, the present invention provides a battery box of a simple and reasonable configuration, and of convenience in assembly, connection and use.

It is therefore an object of the present invention to provide a battery box comprising a housing and a power supply component mounted within the housing. Through holes are provided respectively on both ends of the housing to lead a wire into the housing to connect with the power supply component. The power supply includes a circuit board and a battery. The housing includes an upper housing body and lower housing body which are detachably connected with each other. The upper housing body and the lower housing body could be engaged with each other to form a receiving cavity to receive the power supply component. A contact is provided on the circuit board to be in communication with the battery and correspondingly, a flexible sheet is provided on the upper housing body to press the contact.

In the aforesaid battery box, a bar groove is opened on a surface of the upper housing body to extend through the upper housing body. Two ends of the bar groove are separated from and adjacent to each other to enclose the flexible sheet. The flexible sheet is connected with the upper housing body.

In the aforesaid battery box, the flexible sheet is provided at its bottom with a projecting post which extends vertically downward and could be pressed against the contact.

In the aforesaid battery box, at least one position limiting post is projected from an inner surface of the upper housing body, and at least one position limiting hole is provided at one end of the circuit board correspondingly. The position limiting post extends into the position limiting hole to connect the circuit board with the upper housing body.

In the aforesaid battery box, cushion blocks are respectively provided on both sides of an inner surface of the upper housing body. The cushion blocks are respectively fixedly connected with the inner surface of the upper housing body and a corresponding inner sidewall of the upper housing body Both ends of the circuit board are respectively placed on the corresponding cushion blocks.

In the aforesaid battery box, a connecting post is projected from an inner surface of the upper housing body. A position limiting indentation is provided on one end of the circuit board adjacent to the connecting post. The connecting post is located within the position limiting indentation.

In the aforesaid battery box, connecting plates are respectively provided between the connecting post and two opposite inner sidewalk of the upper housing body. The connecting plates are fixedly connected with the connecting post, the inner sidewalls of the upper housing body and the inner surface of the upper housing body respectively.

In the aforesaid battery box, a mounting groove is formed on the lower housing body to mount the battery. The circuit board is located above the mounting groove and is connected with the battery. The mounting groove is provided at its bottom with a mounting port for replacing the battery. A cover plate is detachably connected with the mounting port.

In the aforesaid battery box, the lower housing body is provided at its bottom with a receiving groove to receive the cover plate. A lock pin extending outward is provided on one side of the cover plate, and a corresponding bayonet is provided at an edge of the receiving groove to be matched with the lock pin.

In the aforesaid battery box, a retainer ring is projected from a lower surface of the receiving groove and the mounting groove and the mounting port are formed within the retainer ring.

In the aforesaid battery box, the receiving groove is provided at its bottom surface with an embedding hole separated from the mounting groove. A convex block is projected from a lower surface of the cover plate. When the cover plate is mounted in the receiving groove, the convex block is embedded into the embedding hole.

In the aforesaid battery box, a wire receiving groove is provided on the convex block. The wire extends from the receiving groove through the embedding hole into the wire receiving groove.

In the aforesaid battery box, two said batteries are provided in stack, in which a battery is in contact with the circuit board and the other battery is in contact with the cover plate. A slot extending to the retainer ring is provided on a sidewall of the lower housing body. An insulating element is inserted within the slot to separate the said two batteries.

In the aforesaid battery box, a lower surface of the lower housing body is provided with an arc-shape groove in communication with one end of the receiving groove, and the arc-shape groove is opposite to an end of the cover plate.

In the aforesaid battery box, a conductive connection wire is provided within the receiving cavity. One end of the conductive connection wire is clamped between the battery and the cover plate, and the other end of the conductive connection wire is separated from the battery and electrically connected with the circuit board. The contact could be in communication with the battery to connect the battery to the circuit board when the flexible sheet is pressed.

In the aforesaid battery box, one end of the conductive connection wire is spirally curved to form a ferrule. A fixing post is projected from a lower surface of the cover plate, and the ferrule is coupled with the fixing post and in contact with the battery.

In the aforesaid battery box, the cover plate, the lower housing body and the upper housing body are fixedly connected with each other via a bolt.

In the aforesaid battery box, the lower housing body is provided at an inner surface with a positioning post which extends to the upper housing body, and correspondingly, the upper housing body is provided at an inner surface with a socket extending downward to receive the positioning post.

In the aforesaid battery box, a convex edge extending upward is formed on the lower housing body adjacent to a top edge, and correspondingly, the upper housing body is provided at its bottom with a concave ring which is matched with the convex edge.

In order to address the technical problems existing in the prior art, it is another object of the invention to provide a necklace provided the aforesaid battery box, which is of a simple structure and capable of emitting lights of different colors.

The present invention provides a necklace provided with the aforesaid battery box, further comprising a necklace chain and a necklace pendant. The necklace chain is a wire, and both ends of the wire are respectively inserted into the housing via the through holes on both ends of the housing and connected with the circuit board. The necklace pendant includes at least two lamp bodies and a plurality of decorative bodies which are connected in series with each other. The decorative bodies are disposed in alternation with the lamp bodies. Different lamp bodies have casings of different colors. Each of the lamp bodies is in communication with the wire and is lightened by pressing the flexible sheet against the contact.

The present invention has the following advantages over the prior art.

First, the battery box according to the invention has a simple and reasonable configuration, in which the power supply component is mounted by using the upper housing body and the lower housing body which are matched with each other, so that various components of the battery box could be more conveniently assembled and connected.

Second, a contact is provided on the circuit board, and a flexible sheet is provided on the upper housing body accordingly which could switch on the circuit by pressing the contact. The said configuration is easier to be operated and the flexible sheet is integrally formed with the upper housing body, to facilitate production and improve the production efficiency to some extent.

Third, the necklace provided with the said battery box uses a wire as the necklace chain, and uses lamp bodies as the necklace pendant. Different lamp bodies use casings of different colors, so that each necklace pendant could emit lights of different colors, which provides an aesthetic appearance to the necklace.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus are not limitative of the present invention, and wherein.

Figure 2:
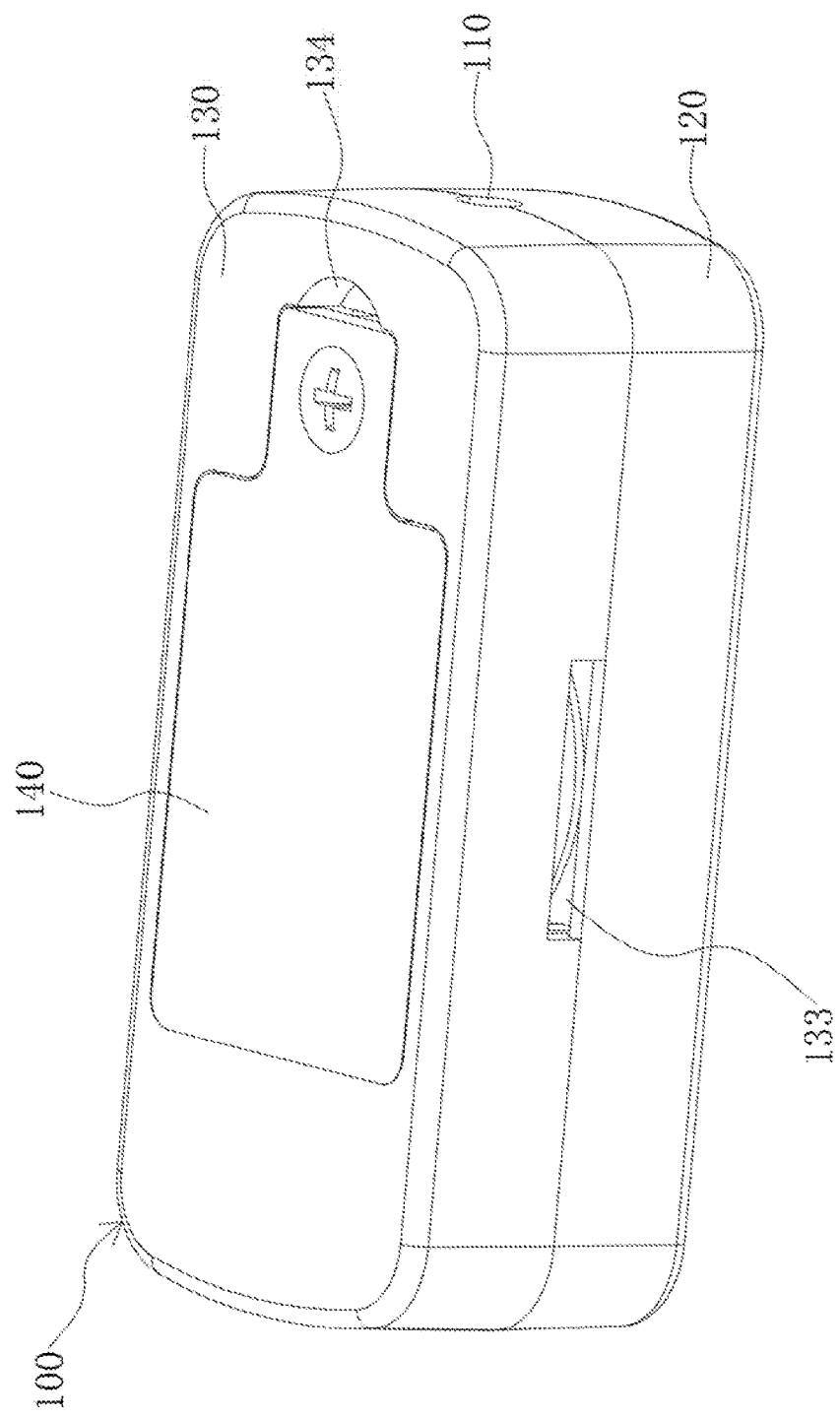
FIG. 2 a back stereogram of the battery box according to an embodiment of the invention.
Figure 5:
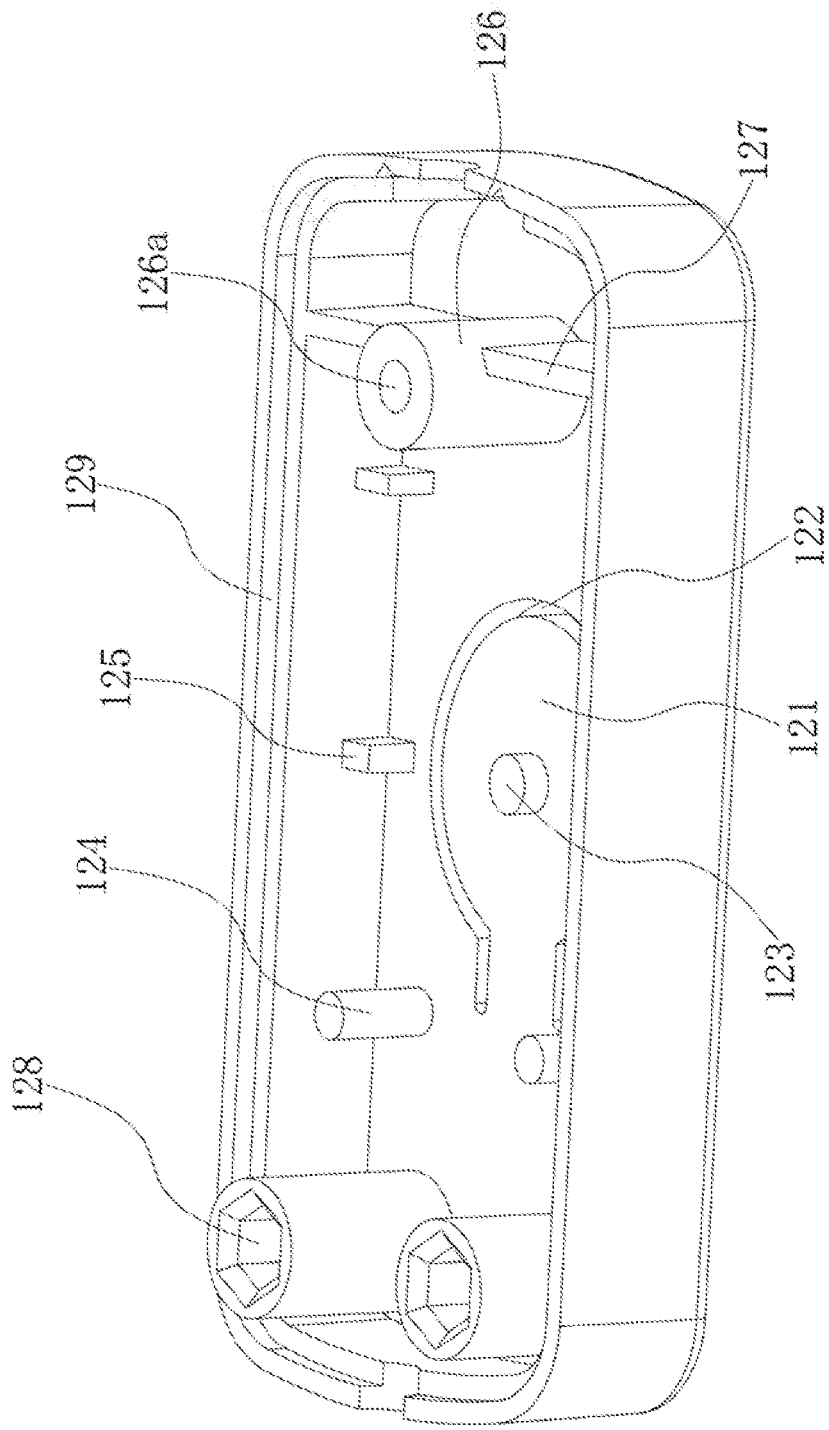
Figure 6:
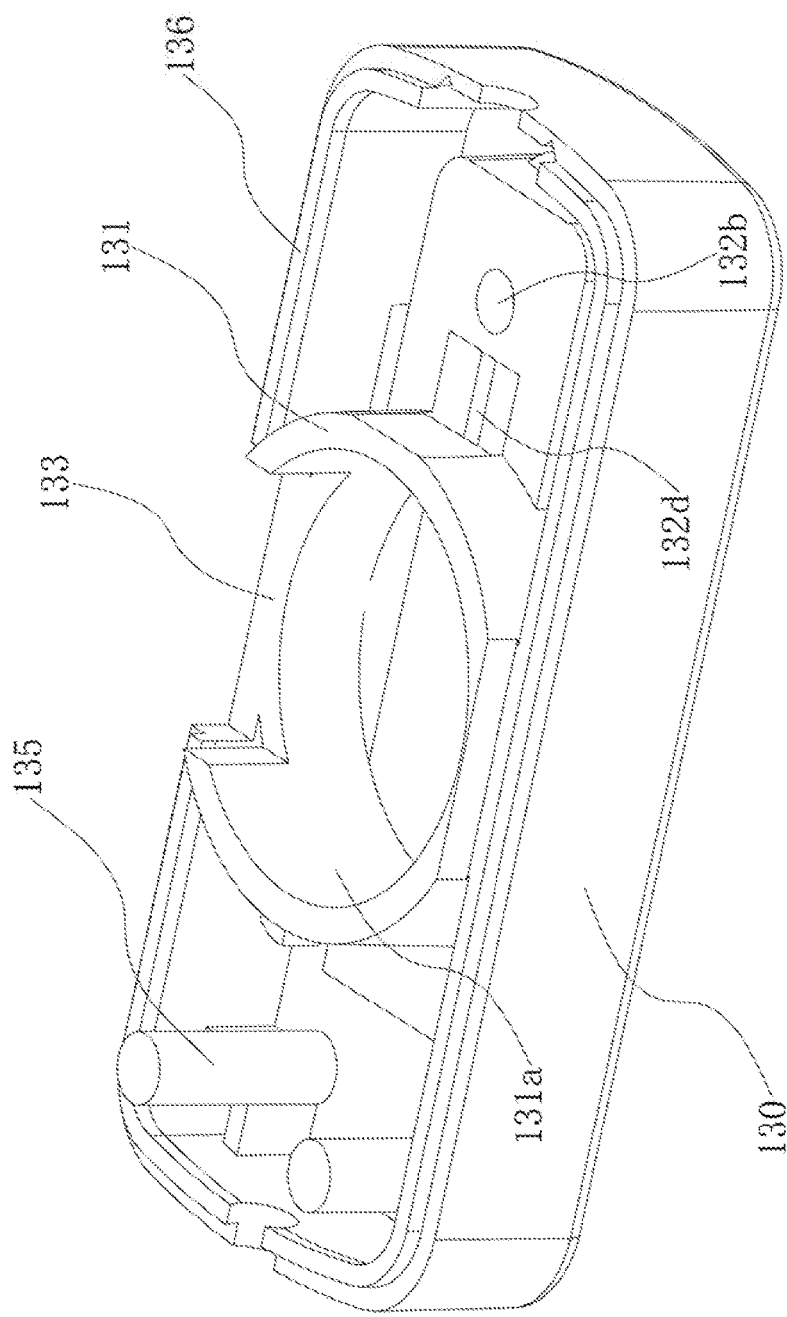
Figure 7:
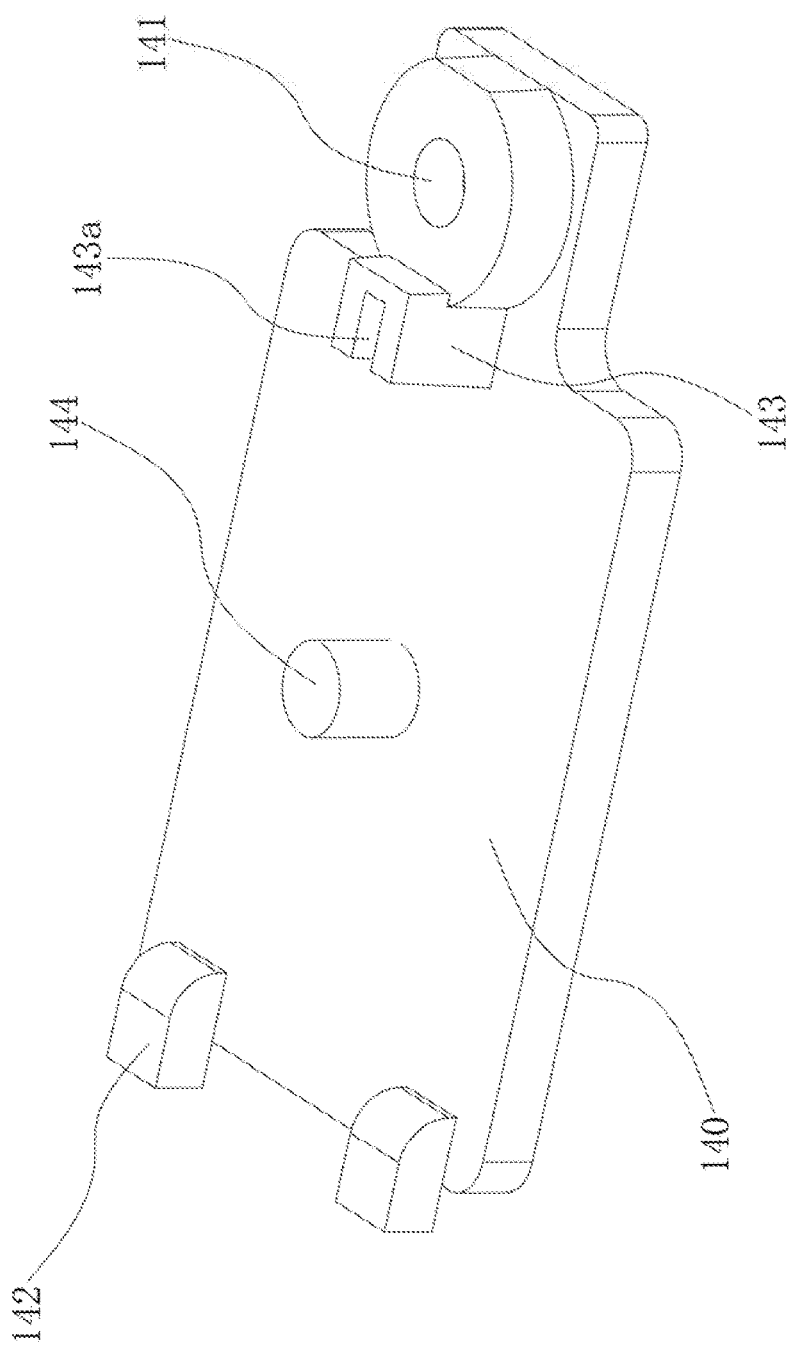

FIG. is an exploded view of FIG. 2;

FIG. 5 is an internal structural diagram of the upper housing body according to the invention;

FIG. 6 is an internal structural diagram of the lower housing body according to the invention;

FIG. 7 is a stereogram of the cover plate according to the invention; and

Figure 8:
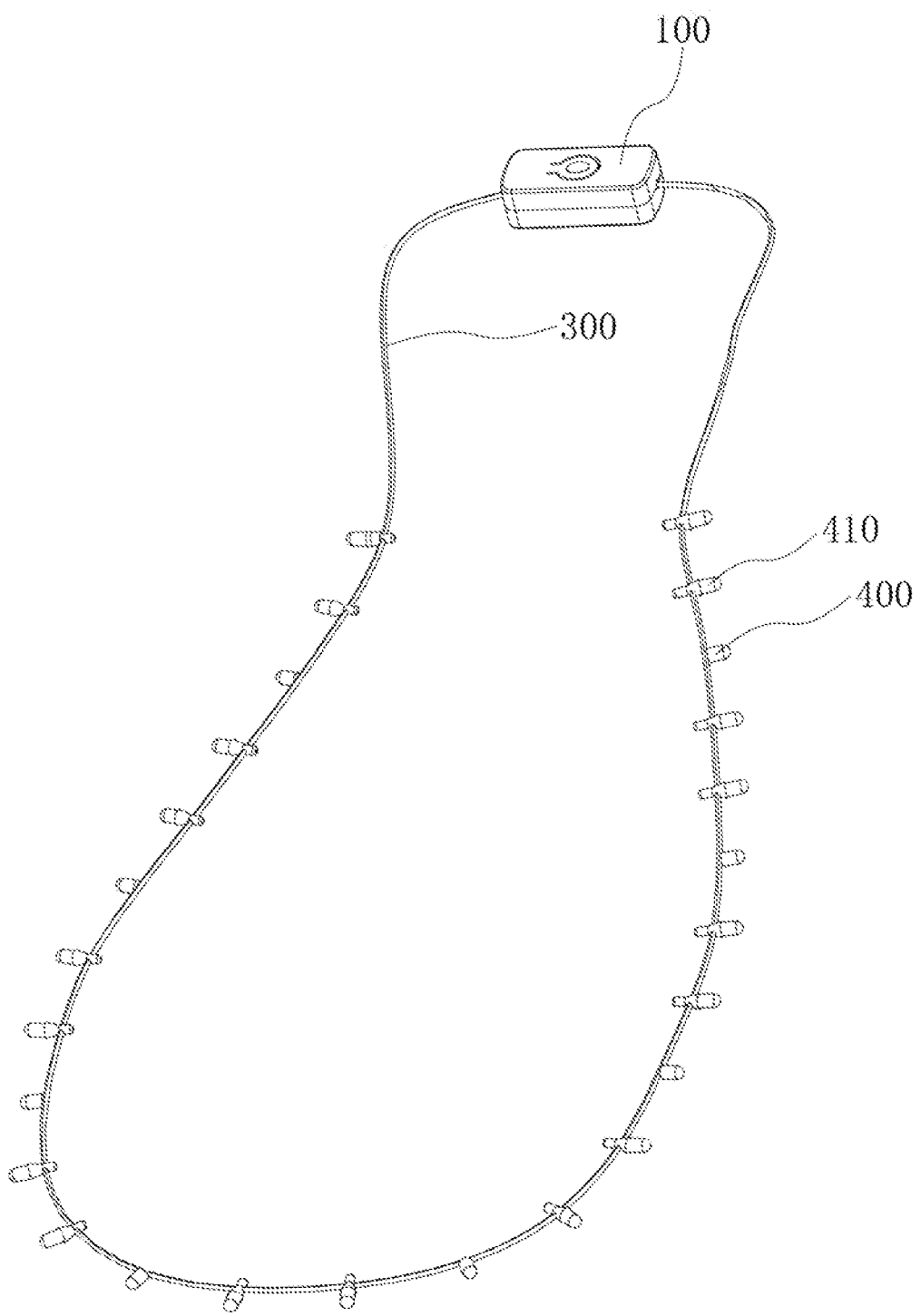

FIG. 8 is a structural diagram of the necklace according to a embodiment of the invention.

DETAILED DESCRIPTION OF THE INVENTION

Embodiments of the present invention will be further described below with reference to the drawings. However, the present invention shall not be limited to these embodiments.

As shown in FIGS. 1-4, a battery box according to the invention comprises a housing 100 and a power supply component 200 mounted within the housing 100.

The housing 100 could be of a square shape or of other shapes, like a circle or an oval. Through holes 110 are provided respectively on both ends of housing 100 to pass the wire 300 connecting with the power supply component 200 within the housing 100. The housing 100 includes a detachable upper housing body 120 and lower housing body 130. The upper housing body 120 and the lower housing body 130 could be engaged with each other to form a receiving cavity. A flexible sheet 121 is provided on the upper housing body 120 and could move relative to the upper housing body.

Figure 3:
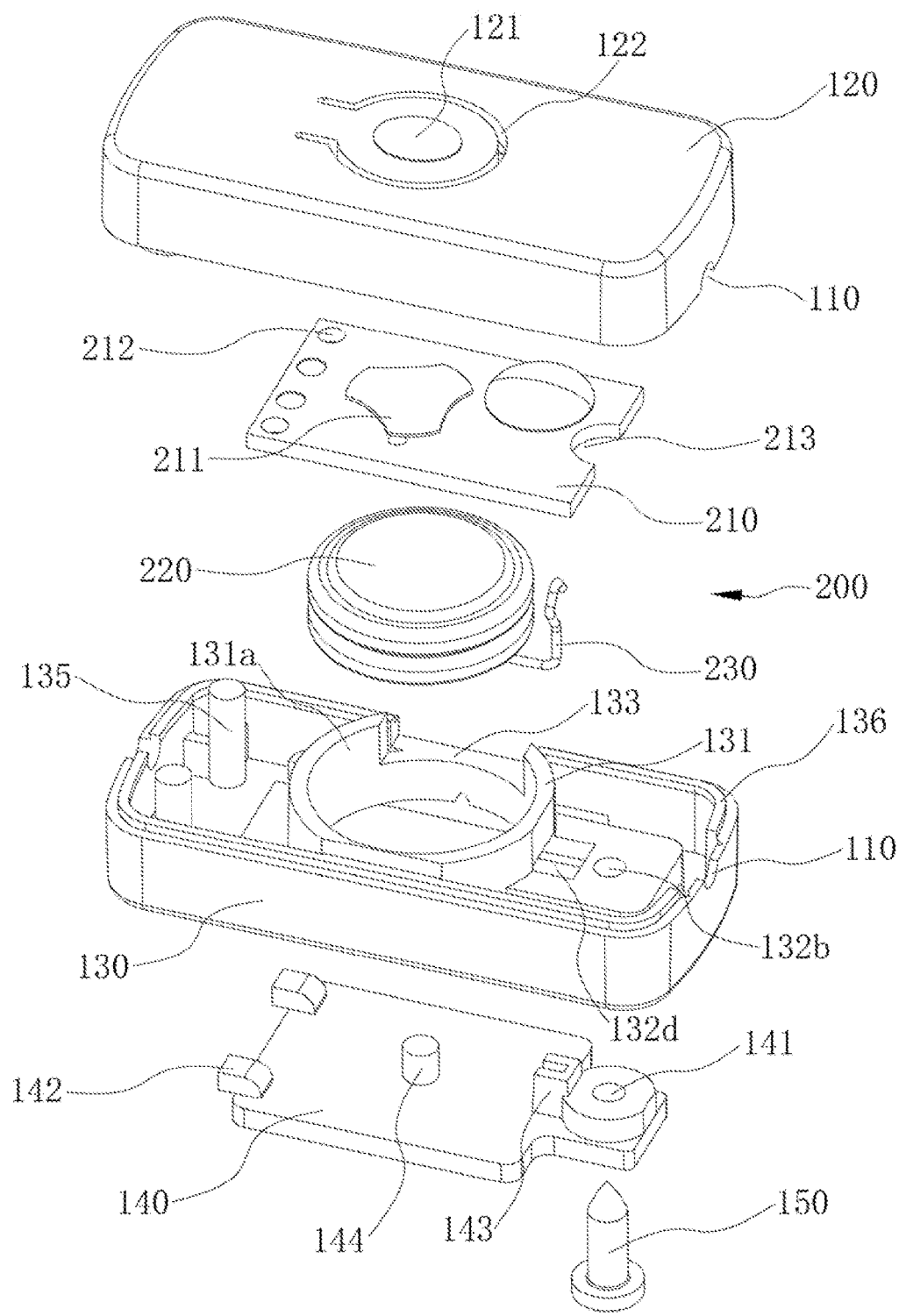
FIG. 3 is an exploded view of FIG. 1.
Figure 4:
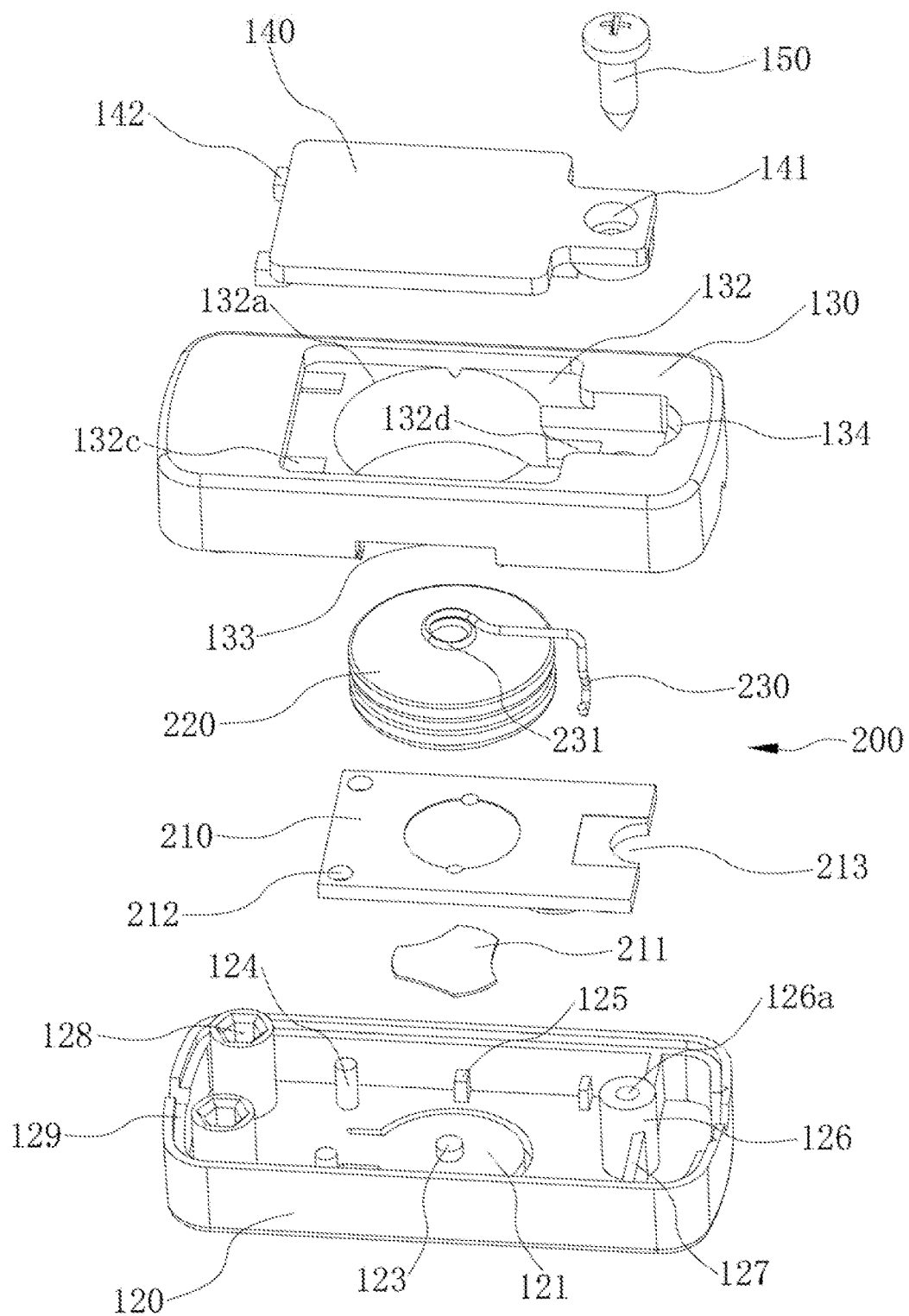

As shown in FIGS. 3 and 4, a power supply component 200 comprises a circuit board 210 and a battery 220. The circuit board 200 is disposed in a horizontal direction and mounted on the upper housing body 120. The battery 220 is mounted on the lower housing body 130. The upper surface of the circuit board 210 is provided with a contact 211 which could be in conduction with the anode of the battery 220. The contact is 211 is separated from the battery 220 in a normal state.

A conductive connection wire 230 is further provided within the receiving cavity. One end of the conductive connection wire 230 is in contact with the cathode of the battery 230, and the other end of the conductive connection wire 230 is separated from the battery 220 and electrically connected with the circuit board 210.

In operation, the flexible sheet 121 is pressed to electrically connect the contact 211 with the battery 220. In such a case, an indirectly switching circuit is formed between the battery 220, the circuit board 210 and the conductive connection wire 230. Therefore, the battery 220 could provide power energy to the circuit board 210 and transmit the current to electronic devices connected with the circuit board 210.

In the present invention, the power supply component 200 is mounted by using the upper housing body 120 and the lower housing body 130 which are matched with each other. As such, the components could be more conveniently mounted and connected in the box of the battery 220. The contact 211 is provided on the circuit board 210 and the flexible sheet 121 is correspondingly provided on the upper housing body 120, which could be used to press the contact 211 to turn on the circuit. Such a configuration provides more convenience in operation.

The present invention makes further improvements on the configuration as mentioned above.

Figure 1:
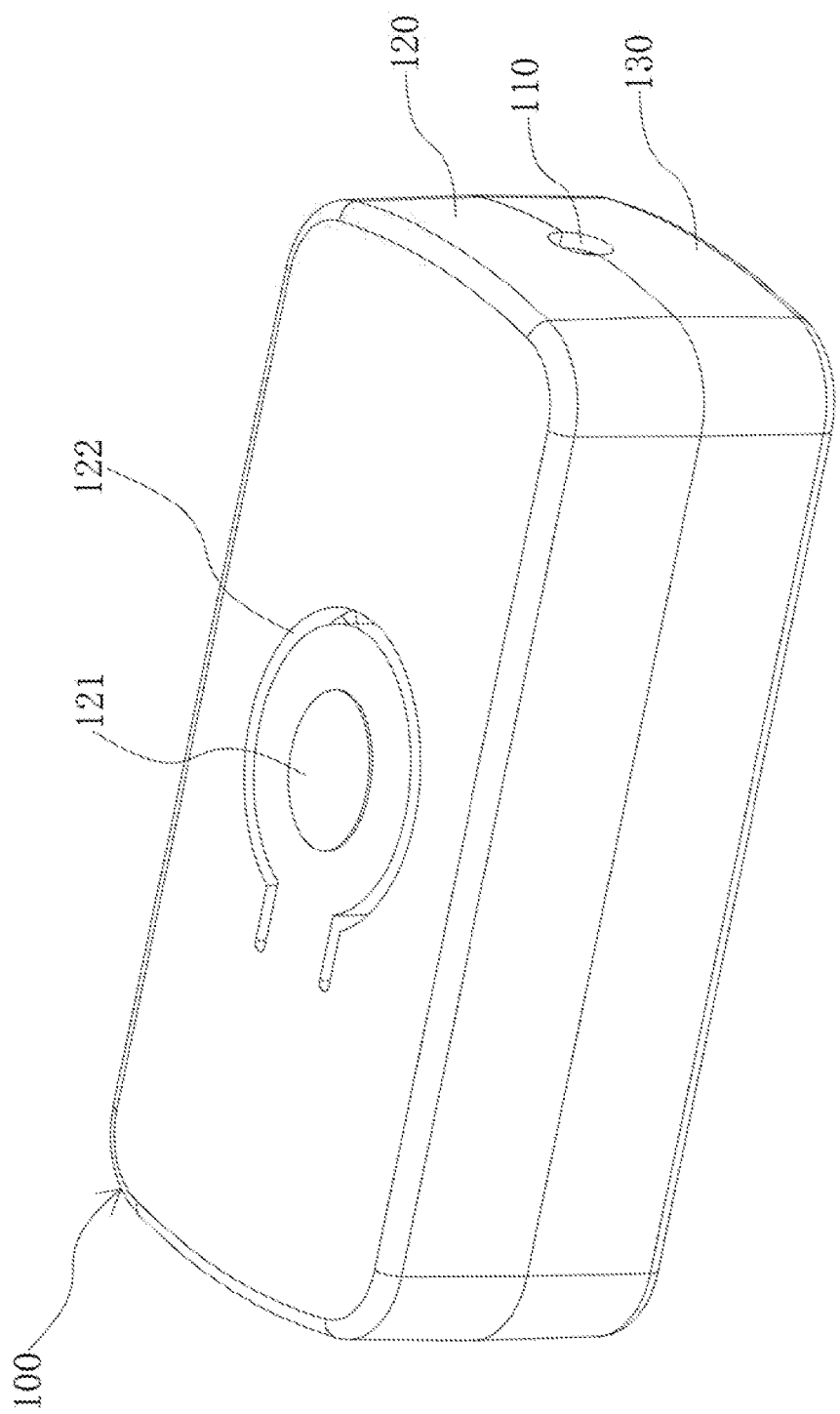
FIG. 1 a front stereogram of the battery box according to an embodiment of the invention.

As shown in FIGS. 1, 3 and 5, a bar groove 122 is opened on the surface of the upper housing body 120 to extend through the upper housing body 120. Two ends of the bar groove 122 are separated from and adjacent to each other. The flexible sheet 121 is enclosed by the whole bar groove 122. The two ends of the bar groove 122 extend to the same end of the upper housing body 120. The bar groove 122 forms a connecting piece to connect the upper housing body 120 with the flexible sheet 121. The bar groove 122 could certainly be of other shapes, like a squire or an oval.

As the flexible sheet 121 is separated from the upper housing body 120 by using the bar groove 122, the flexible sheet 121 has some elasticity and could automatically restore after the flexible sheet 121 is pressed. The flexible sheet 121 could be conveniently used as such. Compared with the existing flexible configurations the flexible sheet 121 is integrated with the upper housing body 120, for which assembly could be avoided and other means having a restoration effect do not have to be provided. This configuration is simple, takes less space and could be conveniently produced.

With reference to FIGS. 4 and 5, a projecting post 123 extends vertically downward from the inner surface of the flexible sheet 121. When the flexible sheet 121 is pressed from outside, the projecting post 123 could be pressed against the contact 211 to make the contact 211 in electric communication with the battery 220. Thanks to the projecting post 123, the contact 211 could be more easily touched when the flexible sheet 121 is pressed, so that the force required to press the flexible sheet 121 is decreased and comfort in pressing is improved.

Furthermore, at least one position limiting post 124 is projected from the inner surface of the upper housing body 120. Preferably, there are two position limiting posts 124 which are adjacent to two sidewalls of the upper housing body 120 respectively. Two position limiting holes 212 are provided in one end of the circuit board 210 accordingly, and are located at two corners of one end of the circuit board 210 respectively. For purpose of mounting, the position limiting posts 124 could pass through the position limiting holes 212 to connect the circuit board 210 with the upper housing body 120. By using such a configuration, the circuit board 210 could be easily detached from the upper housing body 120, which facilitates maintenance and replacement of the circuit board 210. And the position limiting posts 124 are matched with the position limiting holes 212, improving the stability of the circuit board 210 in the horizontal direction and rapid positioning of the circuit board 210 while being mounted.

Moreover, cushion blocks 125 are respectively provided on the both sides of the inner surface of the upper housing body 120. Preferably, two cushion blocks 125 are provided on each side and these two cushion blocks are separated from each other in the axial direction. Each cushion block 125 is respectively fixedly connected with the inner surface of the upper housing body 120 and the corresponding inner sidewall. The upper surface of each of the cushion blocks 125 is in the same plane. The width of the circuit board 210 is smaller than that of the upper housing body 120. The circuit board 210 is located within the receiving cavity of the upper housing body 120 and two ends thereof are placed on the corresponding cushion blocks 125.

The cushion blocks 125 are used to support the circuit board 210 here. The cushion blocks 125 are prevented from staggering up and down within the upper housing body 120, thereby improving stability of the circuit board 210 in the vertical direction. The circuit board 210 is more stably mounted within the upper housing body 120 as such. In the meantime, the circuit board 210 is prevented from moving in synchronization with the flexible sheet when the flexible sheet 121 is pressed, and the projection post 123 could touch the contact 211 easily. Therefore, the sensitivity of the contact between the projecting post 123 and the contact 211.

Moreover, a connecting post 126 is projected at one end of the inner surface of the upper housing body 120. The connecting post 126 is separated from the position limiting posts 124. The flexible sheet 121 is located between the connecting post 126 and the position limiting posts 124. A position limiting indentation 213 is provided on one end of the circuit board 210 adjacent to the connecting post 126, and the connecting post 126 is located in the position limiting indentation 213. A first mounting hole 126a is opened on the connecting post 126 to pass a bolt 150 for connecting the upper housing body 120 with the lower housing body 130.

The circuit board 210, as a core element, has to be well fixed within the housing 100. As discussed above, it is obvious that one end of the circuit board 210 is matched with the position limiting posts 124 located on the upper housing body 120 by providing the position limiting holes 212, and thus the circuit board 210 is mounted and fixed. The other end of the circuit board 210 is movable, and the position limiting indentation 213 is provided on this end of the circuit board t210. The connecting post 126 is mounted on the inner surface of the upper housing body 120 which will be located within the position limiting indentation 213. The connecting post 126 is in contact with the surface of the position limiting indentation 213, so that the other end of the circuit board 210 is fixed to further improve stability of the circuit board 210 in the horizontal direction. The mounting hole is provided on the connecting post 126 to increase the contact area of the mounting elements like the bolt 150 with the upper housing body 120, which efficiently improves the mounting strength of the upper housing body 120.

Furthermore, connecting plates 127 are respectively provided between the connecting post 126 and two opposite inner sidewalls of the upper housing body 120. The connecting plates 127 are fixedly connected with the connecting post 126, the inner sidewalls of the upper housing body 120 and the inner surface of the upper housing body 120 respectively.

The connecting portion of the upper housing body 120 with the lower housing body 130 is the only element subject to a large force, which tends to result in deformation of the connecting post 126 and the upper housing body 120, and break and damage in a serious case. By providing the connecting plates 127, the connecting strength between the connecting post 126 and the inner sidewalls of the upper housing body 120 and the inner surface of the upper housing body 120 is enhanced, and the integrity of the aforesaid three elements is improved as such. When the connecting post 126 is subject to a force, the force would be distributed to the connecting plate 127 and the upper housing body 120 through the connecting post 126, in which case the connecting post 126 is not the only element subject to the force, and the whole upper body 120 is evenly subject to the force. Therefore, the upper housing body 120 is efficiently protected from being damaged.

As shown in FIGS. 3 and 6, a retainer ring 131 is projected upward from an inner surface of the lower housing body 130 in a vertical direction, and a mounting groove 131a is formed within the retainer ring 131. The circuit board 210 is located above the retainer ring 131 and in contact with the battery 220. As the receiving cavity is formed within the lower housing body 120, a complicated configuration will be provided when the mounting groove 131a is formed by other means. Instead, the whole mounting groove 131a could be conveniently molded where the mounting groove 131a is formed by projecting the retainer ring 131 from the inner surface of the housing body. The battery 220 is mounted within the mounting groove 131a and blocked by the retainer ring 131, which improves stability of the battery 220 being mounted on the lower housing body 130.

Referring to FIG. 4, a receiving groove 132 is provided on the outer surface of the lower housing body 130 to receive a cover plate 140. The receiving groove 132 is provided at the bottom surface with a mounting port 132a in communication with the mounting groove 131a. The cover plate 140 could be mounted in the receiving groove 132 to seal the mounting port 132a. The cathode of the battery 220 is pressed against the cover plate 140, and one end of the conductive connection wire 230 is located between the cover plate 140 and the cathode of the battery 220.

The mounting port 132a is provided in such a manner that the battery 220 could be mounted or removed via the lower housing body 130, and does not have to be mounted after the upper housing body 120 is separated from the lower housing body 130. Therefore, the battery 220 could be conveniently replaced. The cover plate 140 could seal the battery 220 within the mounting groove 131a when the battery 220 is in normal use, to prevent the battery 220 moving. And when the battery 220 has to be replaced, the cover plate 140 could be conveniently removed. The receiving groove 132 is provided so that the outer surface of the cover plate 140 will be in line with the outer surface of the lower housing body 130 when the cover plate 130 is mounted on the lower housing body 130. Consequently, the whole volume of the battery box could be efficiently controlled.

Moreover, a second mounting hole 132b is provided on one end of the receiving groove 132 to connect the lower housing body 130 with the upper housing body 130. A third mounting hole 141 is provided on one end of the cover plate 140. The third mounting hole 141, the second mounting hole 132b and the said first mounting hole 126a are in coaxial communication. The cover plate 140 are fixedly connected with the lower housing body 130 and the upper housing body 120 via the bolt 150 in the first mounting hole 126a, the second mounting hole 132b and the third mounting hole 141. The bolt 150 provides convenience in fixed connection of the upper housing 120, the lower housing, body 130 with the cover plate 140.

As shown in FIGS. 7 and 8, a lock pin 142 extending outward is fixed on a lower surface of the cover plate 140. Preferably, there are two lock pins 142 respectively located on both sides at one end of the cover plate 140. Bayonets 132c are provided at one end of the receiving groove 132 to be matched with the lock pins 142. In order for the cover plate 140 to be mounted on the lower housing body 130, two lock pins of the cover plate 140 firstly extend into the corresponding bayonets 132c, the whole cover plate 140 is then placed within the receiving groove 132, and the lock pins 142 are pressed against the inner surface of the lower housing body 130 after entering into the bayonets 132c, which prevents the cover plate 140 being detached from the lower housing body 130.

Referring to FIGS. 3 and 6, the receiving groove 132 is provided at its bottom surface with an embedding hole 132d separated from the mounting groove 131a. The embedding hole 132d is close to the outer sidewall of the retainer ring 131. A convex block is projected upward from the lower surface of the cover plate 140. When the cover plate 140 is mounted in the receiving groove 132, the convex block 143 is embedded into the embedding hole 132d. A wire receiving groove 143a is provided on the convex block 143. The conductive connection wire 230 extends from the receiving groove 132 around the upper end of the retainer ring 131 and passes through the embedding hole 132d, and then enters into the wire receiving groove 143a and extends out from the lower end of the wire receiving groove 143a to be connected with the circuit board 210.

The convex block 143 here has position limiting and locating functions, so that the cover plate could be rapidly and precisely mounted within the receiving groove 132. The convex block 143 is matched with the embedding hole 132d to further improve stability of the rover plate 140 on the lower housing body 130. The wire receiving groove 143a fixes the central part of the conductive connection wire 230, which prevents slight movement of the battery 220 separating the conductive connection wire 230 from the circuit board 210. The stability of the conductive connection wire 230 is further improved as such.

As shown in FIGS. 3 and 4, two batteries 220 are provided in stack in the vertical direction. The anode of the upper battery 220 is pressed against the circuit board 210, and the cathode of the lower battery 200 is in contact with the cover plate 140. A slot 133 extending to the retainer ring 131 is provided on the sidewall of the lower housing body 130. An insulating element, not shown, is inserted within the slot 133 to separate these two batteries 220.

Two batteries 220 are provided to increase the power energy and use life of the battery 220, and the battery 220 could be prevented from being replaced frequently. In a nonuse state, the two batteries 220 would keep discharging slowly if they contact for a long period, which would largely shorten the use life of the battery 220. Consequently, the slot 133 is provided and the insulating element is located within the slot 133 to separate these two batteries t220 from each other. The two batteries 220 could be prevented from being in contact for a long period in the nonuse state. The insulating element could be pulled out of the slot 133 to make these two batteries 220 in electric communication. As such, the two batteries 220 could be easily switched on and off.

Referring to FIG. 4, one end of the conductive connection wire 230 in contact with the battery 220 is spirally curved and is provided with a ferrule 231. A fixing post 144 is projected from a lower surface of the cover plate 140 and pressed against the cathode of the battery 220. The ferrule 231 is coupled with the fixing post 144 and in contact with the battery 220. One end of the conductive connection wire 230 in contact with the battery couples with the fixing post 144 via the ferrule 231. And the conductive connection wire 230 is fixed as such, to guarantee a normal contact of the conductive connection wire 230 with the battery 220 and prevent the conductive connection wire 230 from being separated from the battery 220. The ferrule 231 is directly covered on the fixing post 144 to facilitate removal of the conductive connection wire 230. Meanwhile, the fixing post 144 is pressed against the battery 220 to further increase stability of the battery 220.

Referring to FIGS. 2 and 4, the lower surface of the lower housing body 130 is provided with an arc-shape groove 132 in communication with one end of the receiving groove 132. The arc-shape groove 134 is opposite to one end of the cover plate 140. As discussed above, in order to control volume of the whole battery box, the cover plate 140 is embedded into the receiving groove 132 and the outer surface of the cover plate is in line with the outer surface of the lower housing body 130. However, when the cover plate 140 is to be detached from the lower housing body 130, the cover plate 140 may not be easily removed out of the receiving groove 132. In this case, the arc-shape groove 134 is provided at one end of the receiving groove 132. When the cover plate 140 is taken out, the cover plate 140 could be pried up by extending a hand snail or other minute articles into the arc-shape groove 134.

As shown in FIGS. 3-6, the lower housing body 130 is provided at its inner surface with a positioning post 135 which extends to the upper housing body 120. Correspondingly, the upper housing body 120 is provided at its inner surface with a socket 128 extending downward to receive the positioning post 135. By using such a configuration, the upper housing body 120 could be precisely and rapidly engaged with the lower housing body 130, which makes assembly of the whole battery box more convenient and improves assembly efficiency of the battery box. Meanwhile, the positioning post 135 is inserted into the socket 128 to make a more intimate connection of the upper housing body 120 with the lower housing body 130. The upper housing body 120 does not tend to be separated from the lower housing body 130, improving the integrity of the battery box.

Referring to FIGS. 3-6, a convex edge 136 extending upward is formed on the lower housing body 130 adjacent to the top edge. Accordingly, the upper housing body 120 is provided at its bottom with a concave ring 129 which is matched with the convex edge 129. By using such a configuration, the upper housing body 120 is more intimately connected with the lower housing body 130 at the sidewall edges, and the housing bodies do not tend to deform even under an external force, which further improves the strength of the engagement of sidewalls of the upper housing body 120 and the lower housing, body 130. Additionally, this engagement improves the sealing property of the connection portion of the upper housing body 120 and the lower housing body 130, which efficiently prevents liquid or other contaminants entering into the receiving cavity and guarantees cleanness of the receiving cavity.

As shown in FIG. 8, a necklace according to the invention is provided with the aforesaid battery box, including a box of battery 220, a necklace chain and a necklace pendant. The necklace chain is a wire 300, both ends of which are respectively inserted in to the housing 100 via the through holes 110 on both ends of the housing 100 and connected with the circuit board 210. The necklace pendant includes at least two lamp bodies 400 and a plurality of decorative bodies 410 which are connected in series with each other. The lamp bodies 400 illuminate and the decorative bodies 410 do not illuminate. Different lamp bodies 400 have casings of different, colors. Each lamp body 400 is in communication with the wire 300 and is lightened by pressing the flexible sheet 121 against the contact 211. The decorative bodies 410 have the same or a similar shape as the lamp bodies 400. The decorative bodies 410 are disposed in alternation with the lamp bodies 400, thereby improving the whole decorative effect of the necklace when illuminating.

In the necklace according to the invention, the necklace pendant could by controlled by the battery box to achieve three illuminating modes.

In the first slow-cycle illuminating mode, the lamps will be lightened gradually within a certain period of time, then darkened gradually, and finally turned off, in each cycle. The lamps will be turned on and off respectively for a duration of 2 seconds.

In the second rapid-cycle illuminating mode, the lamps will be lightened quickly and darkened quickly in each cycle. The lamps will be turned on and off respectively for a duration of less than 1 seconds.

In the third constantly illuminating mode, the lamps will keep lightening after it is turned on, and will be turned off by pressing the flexible sheet 121 once again.

The aforesaid three illuminating modes could satisfy different user demands and are applicable in different circumstances. The scope of application of the product is broadened as such to establish different ambiences.

The working principle of the invention is described as follows.

The insulating element inserted between two batteries 220 is pulled out of the slot 133 to make two batteries 220 in electric communication firstly.

The flexible sheet 121 is pressed to press the projecting post 123 against, the contact 211 to make the contact 211 in electric communication with the battery 220. By then, an indirectly switching circuit is formed among the battery 220, the circuit board 210 and the conductive connection wire 230, to transmit power energy from the battery 220 to the circuit board 210. The circuit board further transmits electricity to the wire 300 to provide power to the lamp bodies 400, thereby lightening the necklace pendant.

When the battery 220 is to be replaced, the bolt 150 is screwed of and the cover plate 140 is taken out of the receiving groove 132. The conductive connection wire 230 is thus separated from the battery 220. The used battery 220 is taken out and replaced with a new battery 2290. The cover plate 140 is then placed on the lower housing body and the bolt 150 is screwed on. The battery 220 is replaced as such.

The specific embodiments described herein are merely illustrative of the spirit of the invention. It is apparent to those skilled in the art that various modifications, amendments and alternatives can be made to these embodiments without departing from the spirit or scope defined by the appended claims.

LIST OF REFERENCE NUMERALS

100 Housing
110 Through Hole
170 Upper Housing Body
121 Flexible Sheet
122 Bar Groove
123 Projecting Post
124 Position Limiting Post
125 Cushion Block
126 Connecting Post
126a First Mounting Hole
127 Connecting Plate
128 Socket
129 Concave Ring
130 Lower Housing Body
131 Retainer Ring
131a Mounting Groove
132 Containing Groove
137a Mounting Port
132b Second Mounting Hole
132c Bayonet
132d Embedding Hole
133 Slot
134 Arc-shape Groove
135 Positioning Post
136 Convex Edge
140 Cover Plate
141 Third Mounting Hole
142 Lock Pin
143 Convex Block
143a Wire Receiving Groove
144 Fixing Post
150 Bolt
200 Power Supply Component
210 Circuit Board
211 Contact
212 Position Limiting Hole
213 Position Limiting Indentation
220 Battery
230 Conductive Connection Wire
231 Ferrule
300 Wire
400 Lamp Body
410 Decorative Body

What is claimed is:

1. A battery box, comprising a housing and a power supply component mounted within the housing, through holes are provided respectively on both ends of the housing to lead a wire into the housing to connect with the power supply component, the power supply includes a circuit board and a battery, characterized in that, the housing includes an upper housing body and lower housing body which are detachably connected with each other, the upper housing body and the lower housing body could be engaged with each other to form a receiving cavity to receive the power supply component, a contact is provided on the circuit board to be in communication with the battery and correspondingly, a flexible sheet is provided on the upper housing body to press the contact;

wherein
a mounting groove is formed on the lower housing body to mount the battery, the circuit board is located above the mounting groove and is connected with the battery, the mounting groove is provided at its bottom with a mounting port for replacing the battery, and a cover plate is detachably connected with the mounting port.

2. The battery box as claimed in claim 1, characterized in that, a bar groove is opened on a surface of the upper housing body to extend through the upper housing body, two ends of the bar groove are separated from and adjacent to each other to enclose the flexible sheet, and the flexible sheet is connected with the upper housing body.

3. The battery box as claimed in claim 2, characterized in that, the flexible sheet is provided at its bottom with a projecting post which extends vertically downward and could be pressed against the contact.

4. The battery box as claimed in claim 1, characterized in that, at least one position limiting post is projected from an inner surface of the upper housing body 120, at least one position limiting hole is provided at one end of the circuit board correspondingly, and the position limiting post extends into the position limiting hole to connect the circuit board with the upper housing body.

5. The battery box as claimed in claim 1, characterized in that, cushion blocks are respectively provided on both sides of an inner surface of the upper housing body, the cushion blocks are respectively fixedly connected with the inner surface of the upper housing body and a corresponding inner sidewall of the upper housing body, and both ends of the circuit board are respectively placed on the corresponding cushion blocks.

6. The battery box as claimed in claim 1, characterized in that, a connecting post is projected from an inner surface of the upper housing body, a position limiting indentation is provided on one end of the circuit board adjacent to the connecting post, and the connecting post is located within the position limiting indentation.

7. The battery box as claimed in claim 6, characterized in that, connecting plates are respectively provided between the connecting post and two opposite inner sidewalls of the upper housing body, the connecting plates are fixedly connected with the connecting post, the inner sidewalls of the upper housing body and the inner surface of the upper housing body respectively.

8. The battery box as claimed in claim 1, characterized in that, the lower housing body is provided at its bottom with a receiving groove to receive the cover plate, a lock pin extending outward is provided on one side of the cover plate, and a corresponding bayonet is provided at an edge of the receiving groove to be matched with the lock pin.

9. The battery box as claimed in claim 8, characterized in that, a retainer ring is projected from a lower surface of the receiving groove and the mounting groove and the mounting port are formed within the retainer ring.

10. The battery box as claimed in claim 8, characterized in that, the receiving groove is provided at its bottom surface with an embedding hole separated from the mounting groove, a convex block is projected from a lower surface of the cover plate, and when the cover plate is mounted in the receiving groove, the convex block is embedded into the embedding hole.

11. The battery box as claimed in claim 10, characterized in that, a wire receiving groove is provided on the convex block, and the wire extends from the receiving groove through the embedding hole into the wire receiving groove.

12. The battery box as claimed in claim 9, characterized in that, two said batteries are provided in stack, in which a battery is in contact with the circuit board and the other battery is in contact with the cover plate, a slot extending to the retainer ring is provided on a sidewall of the lower housing body, and an insulating element is inserted within the slot to separate the said two batteries.

13. The battery box as claimed in claim 8, characterized in that, a lower surface of the lower housing body is provided with an arc-shape groove in communication with one end of the receiving groove, and the arc-shape groove is opposite to an end of the cover plate.

14. The battery box as claimed in claim 1, characterized in that, a conductive connection wire is provided within the receiving cavity, one end of the conductive connection wire is clamped between the battery and the cover plate, and the other end of the conductive connection wire is separated from the battery and electrically connected with the circuit board, and the contact could be in communication with the battery to connect the battery to the circuit board when the flexible sheet is pressed.

15. The battery box as claimed in claim 14, characterized in that, one end of the conductive connection wire is spirally curved to form a ferrule, a fixing post is projected from a lower surface of the cover plate, and the ferrule is coupled with the fixing post and in contact with the battery.

16. The battery box as claimed in claim 1, characterized in that, the cover plate, the lower housing body and the upper housing body are fixedly connected with each other via a bolt.

17. The battery box as claimed in claim 1, characterized in that, the lower housing body is provided at an inner surface with a positioning post which extends to the upper housing body, and correspondingly, the upper housing body is provided at an inner surface with a socket extending downward to receive the positioning post.

18. The battery box as claimed in claim 1, characterized in that, a convex edge extending upward is formed on the lower housing body adjacent to a top edge, and correspondingly, the upper housing body is provided at its bottom with a concave ring which is matched with the convex edge.

19. A necklace provided with the battery box as claimed in claim 1, characterized in that, the necklace further comprises a necklace chain and a necklace pendant, the necklace chain is a wire, both ends of the wire are respectively inserted into the housing via the through holes on both ends of the housing and connected with the circuit board, the necklace pendant includes at least two lamp bodies and a plurality of decorative bodies which are connected in series with each other, the decorative bodies are disposed in alternation with the lamp bodies, different lamp bodies have casings of different colors, and each of the lamp bodies is in communication with the wire and is lightened by pressing the flexible sheet against the contact.

* * * * *